United States Patent [19]
Grinaski et al.

[11] Patent Number: 5,203,430
[45] Date of Patent: Apr. 20, 1993

[54] ELEVATOR FLAT LINEAR MOTOR SECONDARY

[75] Inventors: Timothy J. Grinaski, East Hartford; Robin M. Miller, Ellington, both of Conn.

[73] Assignee: Otis Elevator Company, Farmington, Conn.

[21] Appl. No.: 778,026

[22] Filed: Oct. 17, 1991

[51] Int. Cl.$^5$ ............................................. B66B 11/04
[52] U.S. Cl. ..................................... 187/17; 187/112; 310/12
[58] Field of Search ................... 187/17, 1 R, 94, 112; 310/12, 13, 15, 17

[56] References Cited

U.S. PATENT DOCUMENTS

| | | | |
|---|---|---|---|
| 3,860,839 | 1/1975 | Buchberger et al. | 310/12 |
| 3,869,625 | 3/1975 | Sawyer | 310/12 |
| 4,013,906 | 3/1977 | Eastham | 310/13 |
| 4,570,753 | 2/1986 | Ohta et al. | 310/12 |
| 4,803,388 | 2/1989 | Nikura | 310/12 |
| 5,062,501 | 11/1991 | Pavoz et al. | 187/112 |

Primary Examiner—Robert P. Olszewski
Assistant Examiner—Kenneth Noland
Attorney, Agent, or Firm—Lloyd D. Doigan

[57] ABSTRACT

A secondary of an elevator linear motor includes a highly conductive layer, the layer having a plurality of periodically spaced grooves disposed horizontally therein, the grooves providing space for thermal expansion of the layer and guiding current induced on said layer thereby increasing the efficiency of the motor.

2 Claims, 3 Drawing Sheets

ELEVATOR FLAT LINEAR MOTOR SECONDARY

TECHNICAL FIELD

This invention relates to an elevator, and more particularly to a secondary for an elevator flat linear motor.

BACKGROUND OF THE INVENTION

Usually, an elevator's drive sheave and motor are arranged above the elevator car in a machine room. In buildings, where space is at a premium, machine rooms are not desirable.

Hydraulic elevators are driven by a piston which is usually disposed within a cylinder hole beneath the elevator car, thereby obviating the need for a machine room. However, building the hole and maintaining the piston therein is time consuming and expensive. Hydraulic elevators have other drawbacks relative to traction elevators: the rise of the car is limited by the length of the piston; the speed of travel is inferior; and the car weight is not offset by a counterweight making operation relatively inefficient.

Some elevators are driven by a linear motor having a tubular primary element disposed around a tubular secondary element. The linear motor does not require a machine room, as required by a traction elevator, and has no hole, as required by an hydraulic elevator. Also, linear motor driven elevators, relative to hydraulically powered elevators, are energy efficient, operate over a higher rise and are faster. Tubular linear motors typically utilize a secondary element which is hung from the top of the hoistway. At present, it is impractical to hang a secondary element over an extended rise.

UK Patent Application 2,237,555A to Toshiba shows an elevator driven by a linear motor having a flat secondary element and a flat primary element. The secondary element is affixed to the hoistway and avoids the problem of hanging the secondary element from the top of the hoistway. Some elevators have linear motors having highly conductive layers disposed upon the secondary elements thereof for increasing the efficiency of the motor.

DISCLOSURE OF THE INVENTION

It is an object of the invention to maximize the efficiency of an elevator linear motor.

According to the invention, the secondary of an elevator linear motor includes a highly conductive layer, the layer having a plurality of periodically spaced grooves disposed horizontally therein, the grooves providing space for thermal expansion of the layer in plane and guiding current induced on the layer thereby increasing the efficiency of the motor.

These and other objects, features, and advantages of the present invention will become more apparent in light of the following detailed description of a best mode embodiment thereof, as illustrated in the accompanying drawing.

BEST MODE FOR CARRYING OUT THE INVENTION

Figure 1:
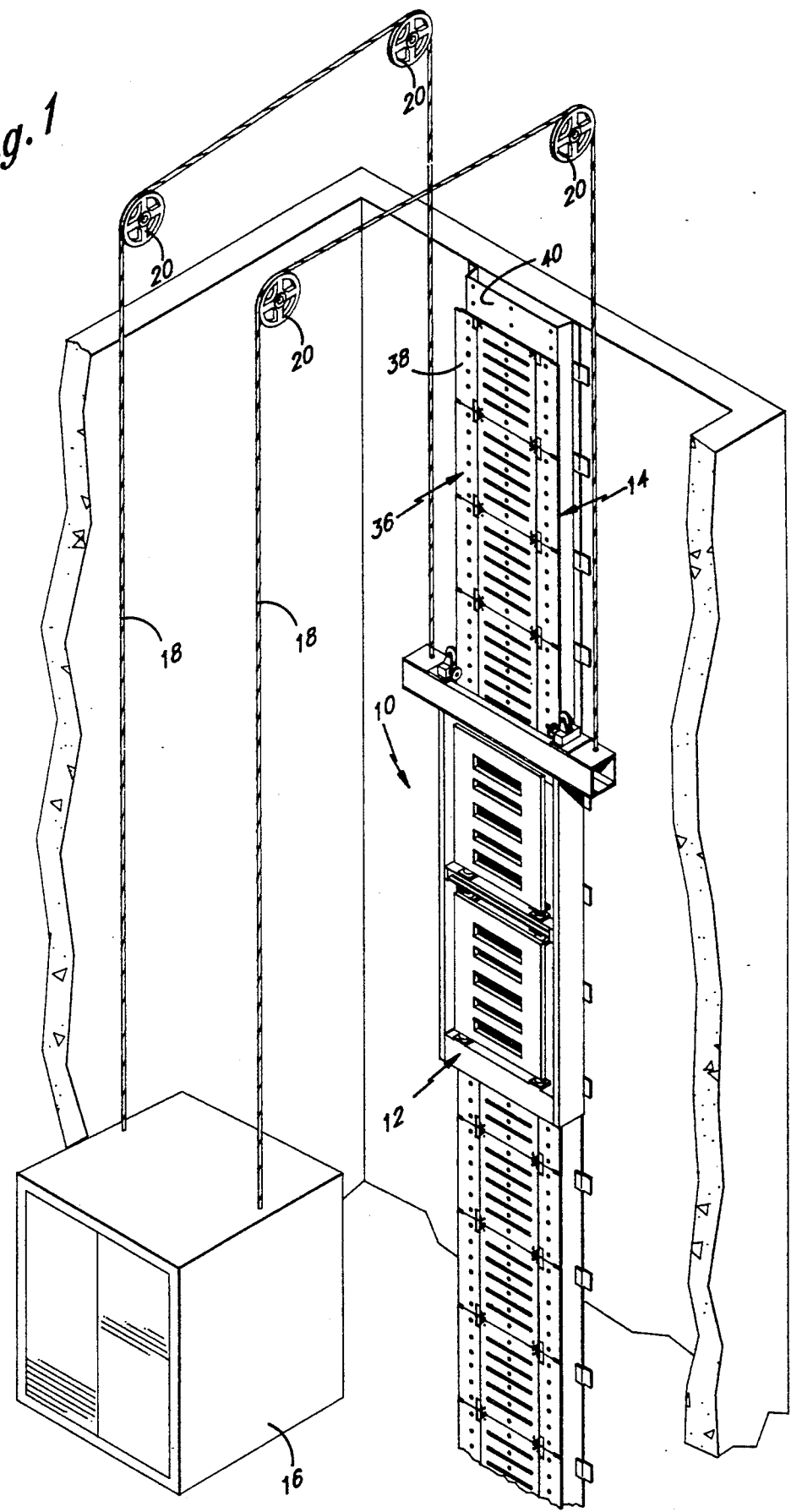
FIG. 1 is a perspective view, partially broken away, and partially in schematic, of an elevator employing a flat linear motor.

Referring to FIG. 1, an embodiment of an elevator employing a flat linear motor 10 is shown. The motor comprises a primary assembly 12 and a secondary assembly 14. The primary assembly, which may act as a counterweight, attaches conventionally to an elevator car 16 by means of ropes 18 and pulleys 20.

Figure 2:
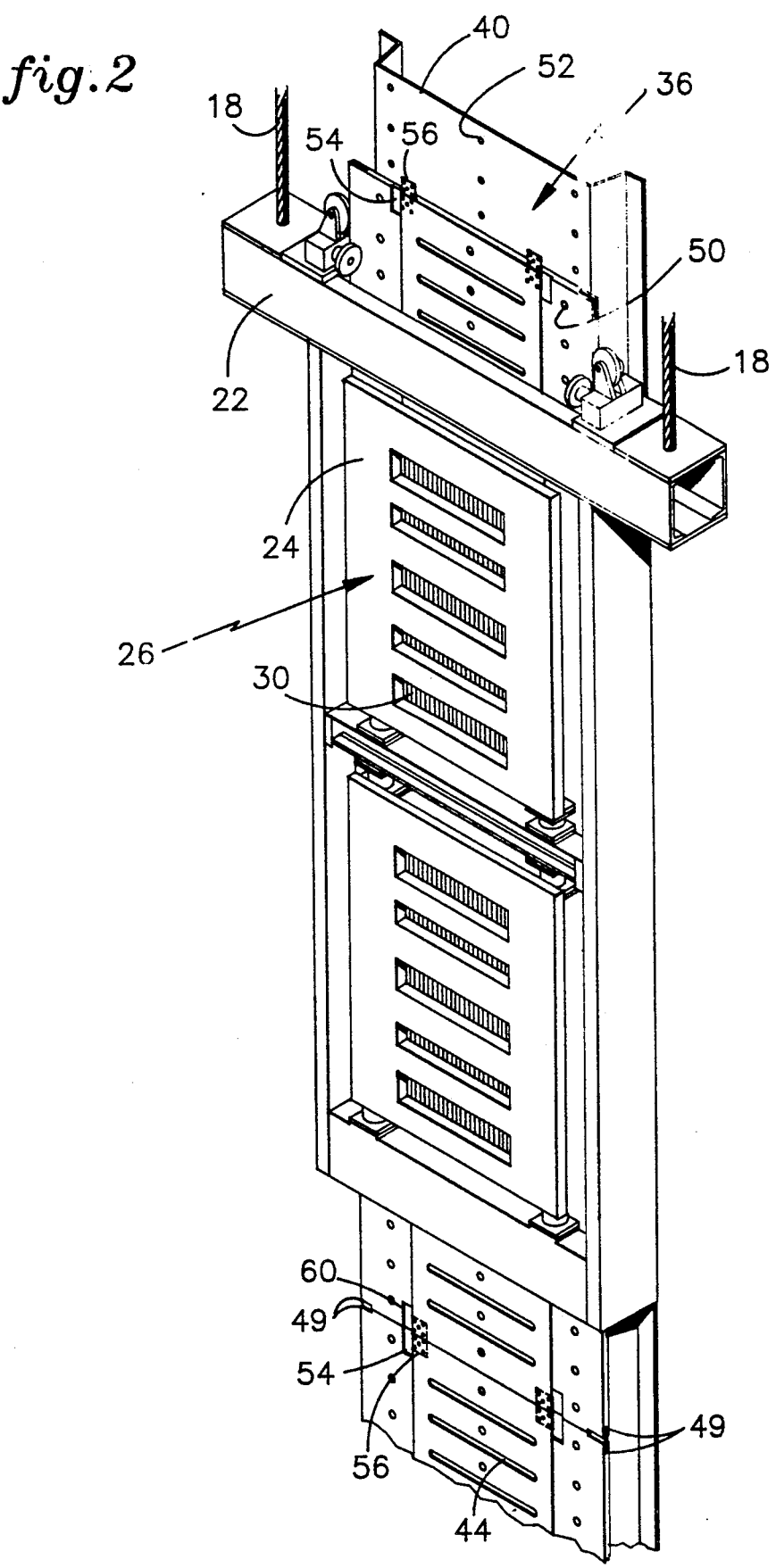
FIG. 2 is a perspective view, partially broken away, and partially in schematic, of the flat linear motor of FIG. 1.
Figure 4:
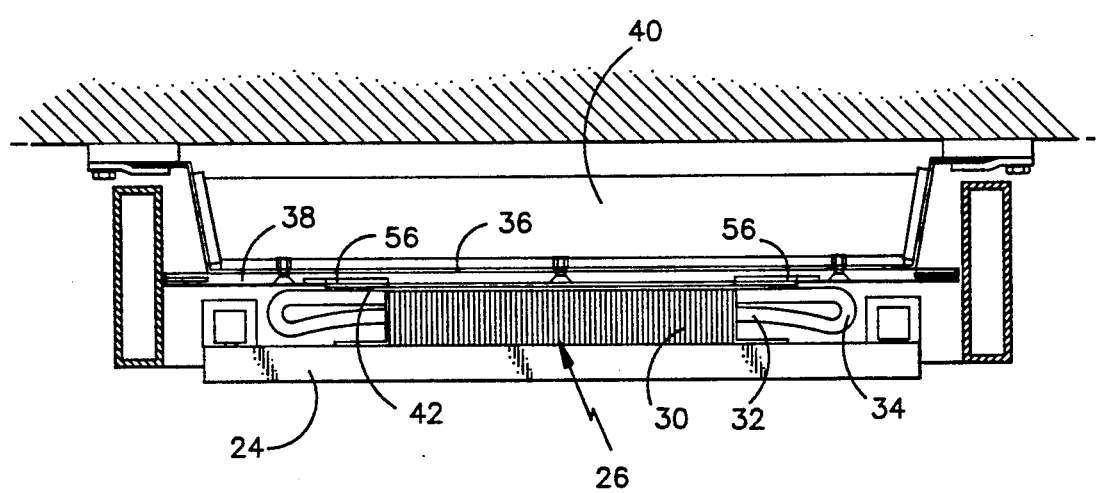
FIG. 4 is a top view, partially broken away, and partially in schematic, of the flat linear motor of FIG. 2.

Referring to FIGS. 2 and 4, the primary assembly 12 comprises a frame 22 attached to the ropes 18, a backing plate 24 attaching to the frame, and a primary element 26 affixed to the backing plate. As known in the art, the primary element is a magnetic fluxcarrying core comprising a plurality of vertically extending, steel laminations 30. A plurality of current carrying coils 32, one set for each phase of excitation and one or more sets per magnetic pole, are situated within slots (not shown) in the laminations as is known in the art. Interconnections 34 are made between coils as is common in the art of motor construction.

The backing plate 24 strengthens and stiffens the primary element against deflection due to magnetic and other dynamic loads. Deflection of the primary element 26 must be minimized to maintain an air gap 36 between the primary element and the secondary element thereby minimizing the potential for interference therebetween. The backing plate transmits thrust forces developed between the primary element and the secondary assembly to the frame 22. As a result, the frame (and the car 16 via ropes 18) may be driven upwardly and downwardly by operation of the motor 10.

The secondary assembly 14 is comprised of a secondary element 36, a support 38, and a plurality of brackets 40. The element 36 and the support 38 are segmented into manageable size and weight for ease of installation. The element, the support, and the brackets provide, as the secondary assembly, enough width to accommodate the magnitude of magnetic flux generated by the primary element.

Figure 3:
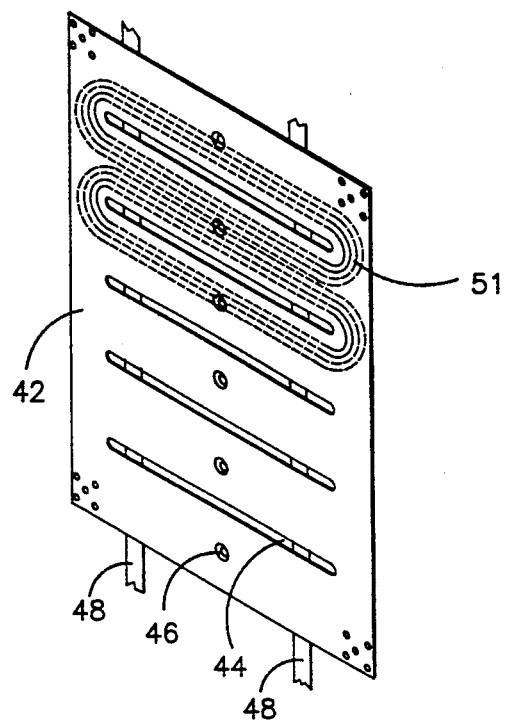
FIG. 3 is a perspective view of a highly conductive layer of the flat linear motor of FIG. 1.

The secondary element 36 comprises a plurality of rectangular, thin sheets 42 of a conductive, nonmagnetic, material such as aluminum, copper, or an alloy thereof, although copper is preferred. Each sheet 42 has a plurality of slots 44 (see FIG. 3) machined therein.

Each slot 44 has the same length as the width of the magnetic core of the primary element 26 and a sufficient width to allow the sheet to expand and contract in plane due to temperature changes induced therein. The width of the slot (2mm is preferred) should also be great enough to discourage arcing thereacross. Without slots, the secondary element may warp or buckle out of plane, thereby causing the secondary element and the primary element 26 to touch, an undesirable event. The slots also function to force current (shown as dashed lines 45 in FIG. 3) induced by the primary element to migrate cleanly about the ends of the slots thereby increasing the efficiency of the motor.

Each sheet 42 has a plurality of countersunk openings 46 for attaching the sheet to the support pieces by means of screws (not shown) or the like. Two vertical and parallel lengths of a double sided tape 48 (shown for ease of depiction in FIG. 3), such as a coated acrylic adhesive transfer tape manufactured by 3M Industrial Specialties Division of St. Paul, Minnesota, anchor the sheet 42 to the support 44 while allowing the secondary element to expand and contract. The countersunk openings are disposed between the two lengths of tape 48.

Each segment of the support 38 is constructed of structural steel or the like, and has: a pair of slots 49 on each top edge and each bottom edge; a key 51 disposed in a slot for adjacent pieces of the support to align each segment of the support; a plurality of openings 50 for bolting or screwing each support piece to the brackets 40; a plurality of central openings 52 for attaching the secondary element 36 to the support and the brackets; and, four rectangular indentations 54 facing the primary assembly.

The indentations 54 receive a close-fitting rectangular bus bar 56 therein as will be discussed infra. One pair of indentations 54 communicates with an upper edge of each support piece and one pair communicates with a lower edge of the support piece 60 (See FIG. 2). Each of the pair of the indentations extends beyond a width of the secondary element to allow each bus bar to be inserted in the indentation behind adjacent sheets of the secondary element.

Each bus bar 56, which comprises a non-magnetic, conductive material, such as aluminum or copper, is attached to the secondary element by means of screws 62 or the like. The screws, which may be countersunk or machined to be flush with the surface of the bus bar, ensure that the bus bar and the secondary are attached with the proper degree of pressure so that the proper degree of conductivity therebetween is maintained.

The bus bars 56 provide a highly conductive surface to conduct current between adjacent segments of the secondary element thereby increasing motor efficiency and minimizing losses.

Although, the invention has been shown and described with respect to a best mode embodiment thereof, it should be understood by those of ordinary skill in the art, that various omission, changes and additions in the form and detail thereof may be made without departing from the spirit and scope of the invention.

We claim:

1. An elevator linear motor secondary, said secondary comprising:
    a support plate,
    a conductive, non-magnetic layer disposed upon said support plate, said layer having a plurality of spaced-apart slots, said slots not extending to edges of said layer to allow current induced upon said layer to extend around ends of said slots, said slots allowing said layer to expand and contract in plane.

2. An elevator linear motor, said motor comprising:
    a primary element, and
    a secondary element, said secondary element comprising:
        a support plate, and
        a conductive, non-magnetic layer disposed upon said support plate, said layer having a plurality of spaced-apart slots, said slots not extending to edges of said layer to allow current induced upon said layer by said primary element to extend around ends of said slots, said slots allowing said layer to expand and contract in plane.

* * * * *